United States Patent [19]

Ota

[11] Patent Number: 4,914,537
[45] Date of Patent: Apr. 3, 1990

[54] MAGNETIC HEAD DEVICE HAVING A BRIDGE CORE

[75] Inventor: Hiroyuki Ota, Saitama, Japan

[73] Assignee: Pioneer Electric Corporation, Tokyo, Japan

[21] Appl. No.: 185,654

[22] Filed: Apr. 25, 1988

[30] Foreign Application Priority Data

| Apr. 24, 1987 | [JP] | Japan | 62-102497 |
| May 21, 1987 | [JP] | Japan | 61-125335 |
| May 21, 1987 | [JP] | Japan | 62-125336 |
| May 28, 1987 | [JP] | Japan | 62-132795 |

[51] Int. Cl.⁴ ............................................. G11B 5/20
[52] U.S. Cl. .................... 360/108; 360/115; 360/123
[58] Field of Search ........... 360/107, 108, 115, 123, 360/125, 109

[56] References Cited

U.S. PATENT DOCUMENTS

| 4,210,945 | 7/1980 | Laurentiev et al. | 360/108 |
| 4,400,752 | 8/1983 | Chabrolle | 360/119 X |
| 4,507,696 | 3/1985 | Hütter | 360/109 |
| 4,709,287 | 11/1987 | Yamashita | 360/109 |

FOREIGN PATENT DOCUMENTS 56-54620 5/1981 Japan ........................ 360/108

OTHER PUBLICATIONS

IBM/TDB, vol. 13, No. 10, Mar. 1971, p. 3076, "Transformer Coupled Rotating Head", by Busllik.

Primary Examiner—John H. Wolff
Attorney, Agent, or Firm—Sughrue, Mion, Zinn, Macpeak & Seas

[57] ABSTRACT

A magnetic head device is disclosed which comprises: a head tip including a pair of cores which are confronted with each other in such a manner that the cores are sufficiently spaced away from each other with a magnetic gap fored at one end; a bridge core bridging the pair of cores to allow a magnetic flux to flow out of one of the pair of cores and flow in the other core; and a coil placed in the path of the magnetic flux.

2 Claims, 7 Drawing Sheets

MAGNETIC HEAD DEVICE HAVING A BRIDGE CORE

BACKGROUND OF THE INVENTION

This invention relates to a magnetic head device suitable for a magnetic recording and reproducing device, the typical example of which is a R-DAT.

In the magnetic head device according to the invention, a coil is not wound on a pair of cores forming a head tip, that is, a bridge core is so arranged that a magnetic flux flows out of one of the pair of cores and flows in the other core, and the coil is placed in the path of the magnetic flux.

Figure 1:
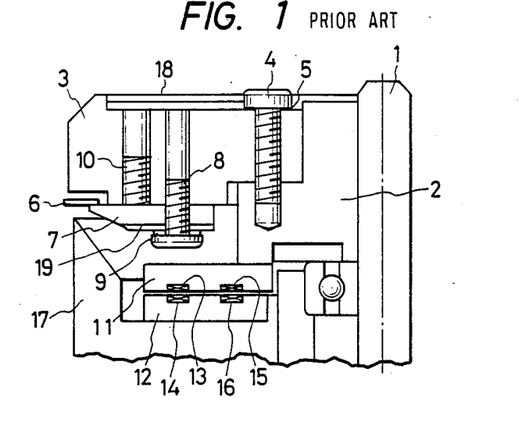
FIG. 1 is a sectional view showing one example of a conventional rotary head device.

FIG. 1 shows the construction of a conventional rotary head device in a magnetic recording and reproducing device such as a video tape recorder or R-DAT.

In FIG. 1, reference numeral 1 designates a shaft which is rotated for instance by an electric motor (not shown), to which a flange 2 is secured; 3, a rotary drum secured to the flange 2 with screws 4 and washers 5; 6, a magnetic head secured to a diaphragm 7 which together with a diaphragm base plate 19 is secured to the rotary drum 3 with a screw 8 and a washer 9; and 10, a screw engaged with the rotary drum. The screw 10 is turned to depress the diaphragm 7 thereby to adjust the level (height) of the head 6. A core 11 having coils 13 and 15 is fixedly secured to the flange 2. A core 12 having coils 14 and 16 is secured to a stationary drum 17 in such a manner as to confront with the core 11. The stationary drum 17 is mounted on the shaft 1, but it is not rotated by the latter 1. The core 11 and the coils 13 and 15 form a rotor, while the core 12 and the coils 14 and 16 form a stator, and the rotor and the stator form a rotary transformer. The head 6 is electrically connected through the diaphragm base plate 19 or a relay base plate 18 to the coil 13 (or 15).

Figure 2:
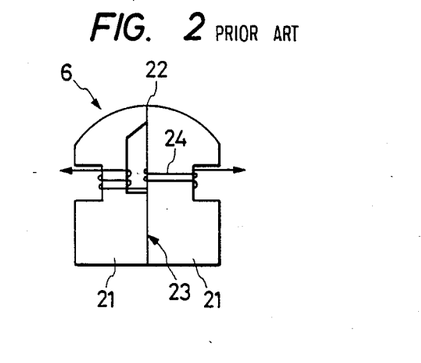
FIG. 2 is a plan view showing a magnetic head in the rotary head device in FIG. 1.

FIG. 2 shows the structure of the magentic head 6. A pair of cores 21 are juxtaposed in such a manner that one end portion of one of the cores 21 and one end portion of the other core 21 form a gap 22, and the other end portions 23 of the cores 21 are coupled to each other; that is, the cores 21 form a closed magnetic path. A coil 24 connected to the coil 13 (or 15) is wound on the cores 21.

As the shaft 1 is rotated, the head 6, the core 11 and the coils 13 and 15 are rotated as one unit. On the other hand, a magnetic flux from a magnetic tape (not shown) flows in one of the cores 21 through the magnetic gap 22 and flows in the other core 21, and flows out of the latter 21 through the magnetic gap 22. As a result, an electromotive force is induced in the coil 24, and a reproducing signal flows in the coil 13 (or 15). The reproducing signal is applied through the other coil 14 (or 16) forming the rotary transformer to a circuit (not shown).

Another magnetic head (not shown) is provided in such a manner that it is 180° apart from the above-described head 6, and the reproducing output of the head is applied through the coil 15 (or 13) and the coil 16 (or 14) to an external circuit.

In a signal recording operation, the current flows in a direction opposite to the direction of current in the signal reproducing operation.

As was described above, in the conventional magnetic head device, the coil 24 is wound on the cores 21. Therefore, the conventional magnetic head device is manufactured substantially by handwork. Accordingly, the conventional magnetic head device is disadvantageous in that its manufacture takes a relatively long time, and it is accordingly high in manufacturing cost, and it is bulky.

Also as was described above, in the conventional rotary head device, the head 6 is secured to the diaphragm 7, which is secured to the rotary drum 3. Therefore, the conventional device is disadvantageous in that it is large in the number of component, high in manufacturing cost, and bulky.

Accordingly, an object of this invention is provide a magnetic head device which is so designed that it can be manufactured by automation for reduction of the manufacturing cost, and which can be miniaturized.

SUMMARY OF THE INVENTION

The foregoing and other objects of the invention have been achieved by the provision of a magnetic head device which, according to the invention, comprises: a head tip including a pair of cores which are confronted with each other in such a manner that the cores are sufficiently spaced away from each other with a magnetic gap fored at one end; a bridge core bridging the pair of cores to allow a magnetic flux to flow out of one of the cores and flow in the other; and a coil placed in the path of the magnetic flux.

As was described above, in the magnetic head device of the invention, the pair of cores forming the head tip are confronted with each other in such a manner that they are sufficiently spaced away from each other with the magnetic gap formed at one end that no magnetic flux is allowed to flow directly between the cores. However, the bridge core is provided for the pair of cores so that a magnetic flux is allowed to flow out of one of the pair of cores and flow in the other. And the coil is placed in the path of the magnetic flux thus allowed to flow.

The foregoing objects of the invention have been achieved also by the provision of a rotary head device which, according to the invention, comprises: a rotary drum mounted on a shaft in such a manner that the rotary drum and the shaft rotate as one unit; a first core secured to the rotary drum; a first coil provided on the first core; a stationary drum mounted on the shaft in such a manner that the stationary drum is not rotated by the shaft; a second core secured to the stationary drum; a second coil provided on the second core; a joining member having one end portion secured to the first core; a magnetic head secured to the other end portion of the joining member; and a screw for depressing the joining member.

As was described above, the first core is secured to the rotary drum which rotates together with the shaft, and the first coil is provided on the first core. The second core is secured to the stationary drum which is mounted on the shaft, but not rotated by the latter. The second coil is provided on the second core. The first core, the first coil, the second core, and the second coil form a rotary transformer. One end portion of the joining member is secured to the first core, and the other end portion is secured to the head. The level (height) of the head is adjusted by depressing the combining member with the screw.

DESCRIPTION OF THE PREFERRED EMBODIMENTS

Preferred embodiments of the invention will be described with reference to FIGS. 3 through 16, in which parts corresponding functionally to those which have been already described with reference to FIGS. 1 and 2 are therefore designated by the same reference numerals or characters.

Figure 3:
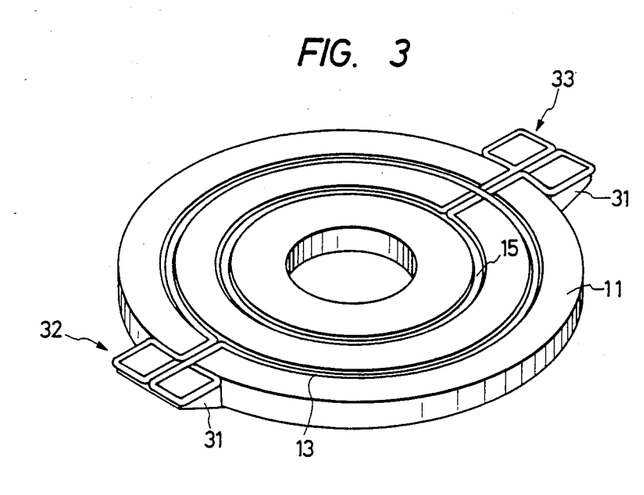
FIG. 3 is a perspective view showing a rotor in one example of a magnetic head device according to this invention.
Figure 4:
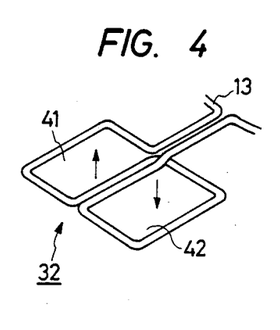
FIG. 4 is a perspective view showing a coil of the rotor.
Figure 5:
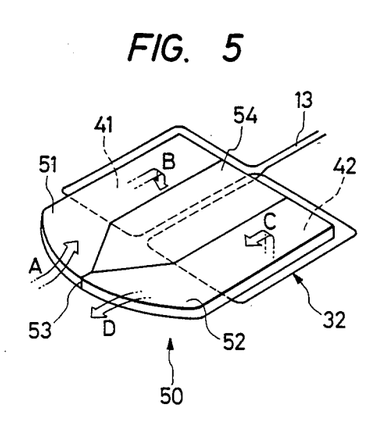
FIG. 5 is a perspective view showing the assembly of the coil and a head tip in the magnetic head device.

FIGS. 3, 4 and 5 show a first embodiment of the invention. In the embodiment, protrusions 31 extend from the periphery of the core 11 forming the rotor of the rotary transformer. The coil 13 of the rotary transformer extends to form a coil 32 which forms a portion of a magnetic head. Similarly, the other coil 15 extends to form a coil 33 which forms a portion of the magnetic head. The coils 32 and 33 thus formed are provided on the protrusions 31, respectively. Under this condition, the coils 13 and 15 of the rotary transformer and the coils 32 and 33 of the magnetic head are substantially in one and the same plane.

Figure 6:
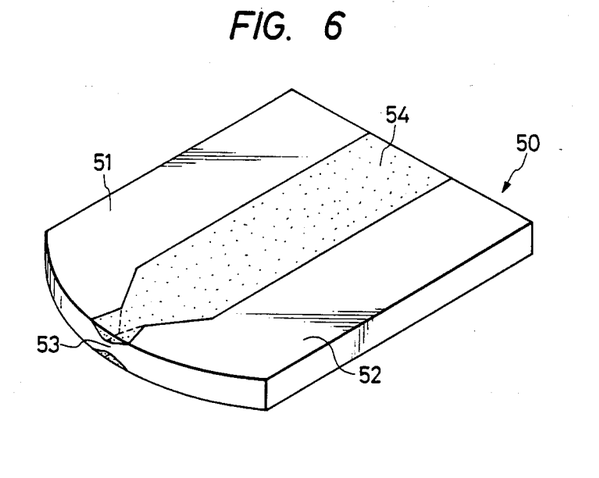
FIG. 6 is a perspective view of the head tip.
Figure 7:
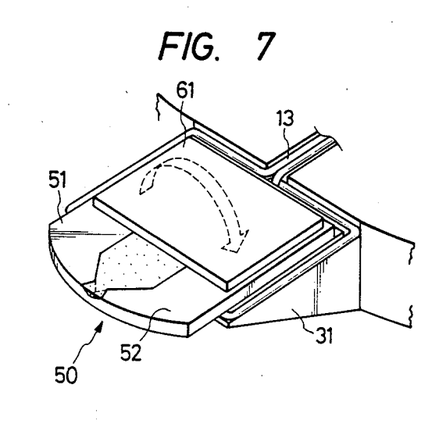
FIGS. 7 and 8 are perspective views showing examples of the assembly of the head tip and a conductive member.
Figure 8:
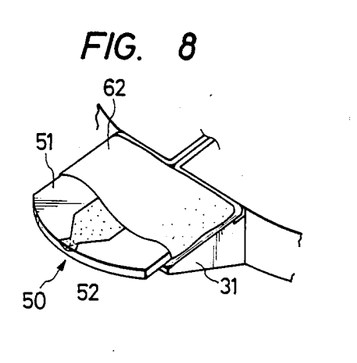

Each of the coils 32 and 33, as shown in FIG. 4, has two loops 41 and 42. The loops 41 and 42 are so wound that, when current flows in the coil, the magnetic flux formed by one of the loops 41 and 42 is opposite in direction to that formed by the other as indicated by the arrows in FIG. 4. A head tip 50 as shown in FIGS. 6 through 8 is fixedly secured to each of the coils 32 and 33 as shown in FIG. 5.

The head tip 50 is made up of a pair of cores 51 and 52 of permeable material such as ferrite. The cores 51 and 52 are confronted with each other in such a manner that they form a magnetic gap 53 at one end, and the remaining parts of the cores 51 and 52 which are other than the parts forming the magnetic gap are spaced sufficiently apart from each other that no magnetic flux flows directly between them. In order to effectively prevent the direct flow in and out of magnetic flux, the space between the cores 51 and 52 is filled with a member 54 of nonmagnetic material such as glass, metal or ceramic as shown in FIG. 6. Alternatively, a conductive plate 61 made of metal plate or foil, or conductive paint is placed over the cores 51 and 52 so as to minimize the leakage magnetic flux which is established upwardly by eddy current (as shown in FIG. 7). The same effect can be obtained by fixing the head tip 50 and the coil 32 to the protrusion 31 with conductive adhesive 62 (as shown in FIG. 8).

Accordingly, as shown in FIG. 5, a magnetic flux (A) flowing in the core 51 through the magnetic gap 53 is allowed to flow in the core 51, out of the core 51 and in the protrusion 31 serving as a bridge core (as indicated at B). The magnetic flux (B) flowing in the protrusion 31 is allowed to flow in the protrusion 31, through the junction of the core 52, and in the core 52 (as indicated at C). The magnetic flux (C) flowing in the core 52 is allowed to flow in the core 52, and out of the core 52 through the magnetic gap 53 (as indicated at D). The loop 41 is provided in the path of the magnetic flux (B) which flows out of the core 51 and in the protrusion (bridge core) 31, while the loop 42 is provided in the path of the magnetic flux (C) which flows out of the protrusion 31 and in the core 52. Therefore, the electromotive force induced in the loop 41 is added to that induced in the loop 42, and a current flows in the coil 32. Since the extension of the coil 32 is the coil 13, the current in the coil 32 is allowed to flow in the coil 13 as it is, as a result of which the corresponding current is outputted by the coil 14 forming the rotary transformer.

In the same manner, the signal of the coil 33 in the other channel is outputted by the coil 15.

The coils 13, 14, 15, 16, 32 and 33 are of one turn as shown; however, it goes without saying that they may be of more than one turn. These coils may be formed by using ordinary conductors; however, a so-called "winding operation" is unnecessary to form the coils. Therefore, the coils may be formed by printing, metallizing or blanking, and in this case the wire connecting operation can be eliminated.

Figure 9:
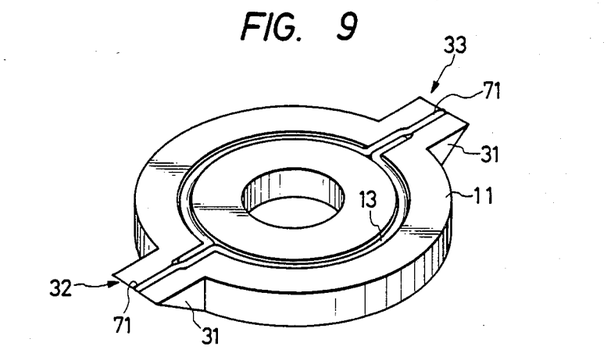
FIG. 9 is a perspective view showing a rotor in another example of the magnetic head device according to the invention.
Figure 10:
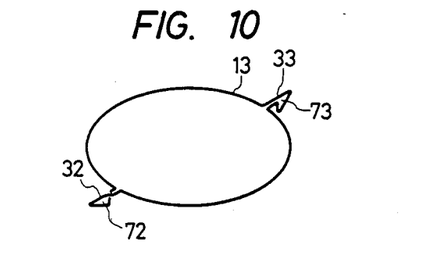
FIG. 10 is a perspective view showing a coil in the rotor of FIG. 9.
Figure 11:
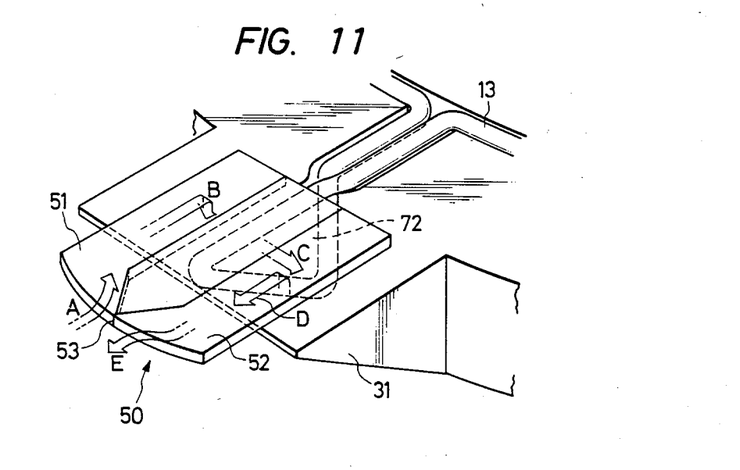
FIG. 11 is a perspective view showing the assembly of a head tip and the coil shown in FIG. 10.

FIGS. 9, 10 and 11 shows a second embodiment of the invention. In the second embodiment, a groove 71 is formed in each of the protrusions 31 in such a manner that it is extended radially, and the coils 32 and 33 have loops 72 and 73, respectively. As shown in FIG. 11, a magnetic flux (A) coming in the core 51 is allowed to flow in the core 51, out of the core 51 and in the protrusion 31 (as indicated at B). The magnetic flux (B) entering the protrusion 31 is allowed to pass through the protrusion 31 (as indicated at C). The magnetic flux (D) flowing out of the protrusion 31 flows in the core 52. The magnetic flux passed through the core 52 flows out through the magnetic gap 53 (as indicated at E). The magnetic flux (C) flowing in the protrusion 31 passes through the loop 72 (or 73), as a result of which an electromotive force is induced in the coil 32 (or 33), and a current flows in the coil 13.

In the embodiment, the coils 32 and 33 forming two magnetic heads are connected in series to each other, and the coil forming the rotary transformer is of only one channel (i.e., only the coil 13 is provided). Therefore, the current flowing in the coil 32 will also flow in the coil 33. In this connection, it should be noted that, in the R-DAT, each of the two rotary heads spaced 180° apart from each other is brought into contact with the magnetic tape for 90° degrees; that is, while one of the two rotary heads is being used, the other is not used at all. Accordingly, by effecting the input and output of one channel of the rotary transformer in a time division mode, signals can be recorded or reproduced similarly as in the case of two channels. In this case, the diameter of the rotary transformer, and accordingly the diameter of the rotary drum 3 can be reduced.

The second embodiment is lower in efficiency than the first embodiment; however, the second embodiment will have substantially no trouble in recording and reproducing signals in a digital mode as in the case of the R-DAT.

Figure 12:
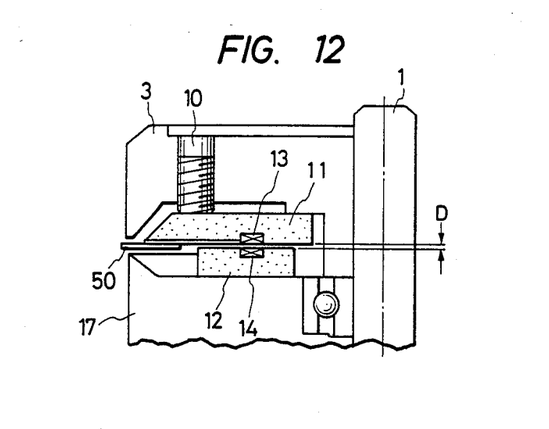
FIG. 12 is a sectional view showing one example of a rotary head device using the assembly shown in FIG. 11.

It goes without saying that the method of series-connecting two rotary heads can be applied to the magnetic head device which is formed as shown in FIGS. 4 and 5. FIG. 12 is a sectional view showing a magnetic head device employing the method. In the magnetic head device of FIG. 12, a rotary drum 3 is secured directly to the shaft 1, and a core 11 is secured to the rotary drum 3 with adhesive. A screw 10 is turned to move the core 11 thereby to adjust the level (height) of a head tip 50. The distance D between the cores 11 and 12 forming the rotary transformer is generally ranged from 40 μm to 50 μm, and the adjustment of the level of the head tip is in a range of from 5 μm to 10 μm. Therefore, the clearance between the cores 11 and 12 is not substantially affected by the adjustment of the level of the head. In this case, the number of components can be greatly reduced.

Figure 13:
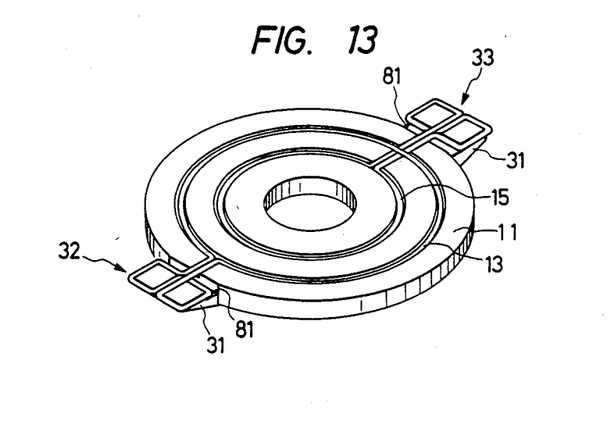
FIG. 13 is a perspective view showing another example of the rotor.
Figure 14:
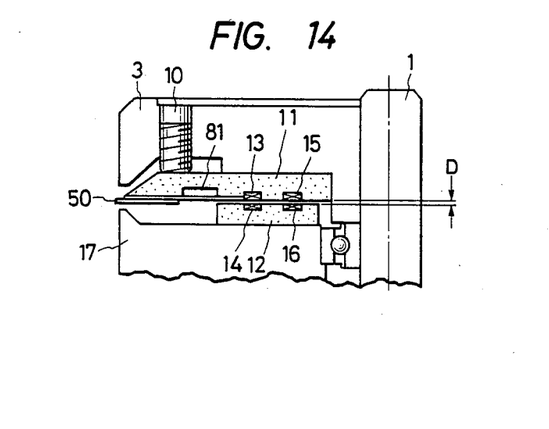
FIG. 14 is a sectional view showing another example of the rotary head device.

FIGS. 13 and 14 shows one modification of the magnetic head device shown in FIGS. 3 through 5. In the modification, a groove 81 is formed in each of the protrusions 31 in such a manner that it is extended across the protrusion. In the magnetic head device shown in FIGS. 13 and 14, stress caused by the screw 10 is concentrated at the groove 81 on 17. Therefore, the magnetic head device of FIGS. 13 and 14 is advantageous in that the clearance D between the cores 11 and 12 is scarcely affected by the adjustment of the level of the head, and accordingly the rotary transformer is maintained unchanged in characteristic.

Figure 15:
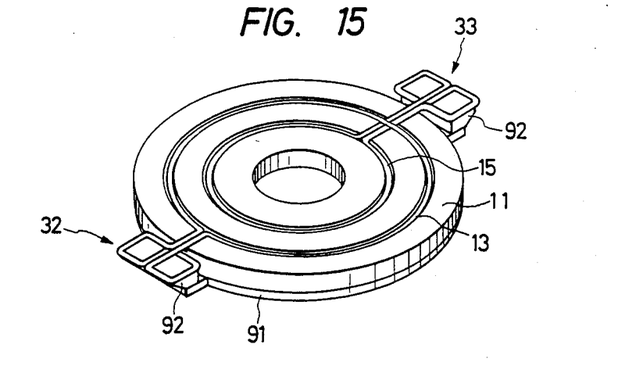
FIG. 15 is a perspective view showing another example of the rotor.
Figure 16:
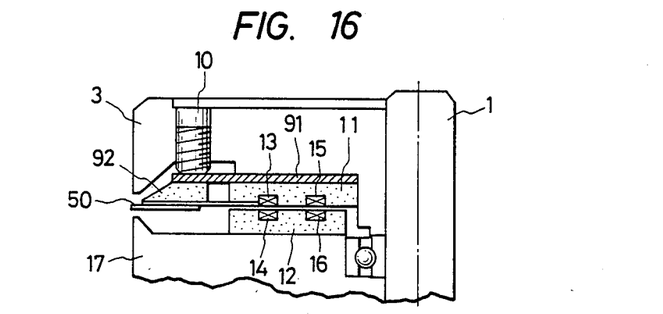
FIG. 16 is a sectional view showing another example of the rotary head device.

FIGS. 15 and 16 shows another embodiment of the invention in which separately from the core 11 of the rotary transformer a core 92 is provided, as a bridge core, for each of the magnetic heads, and the core 11 and the core 92 are combined together with a joining member 91 of nonmagnetic material such as metal or ceramic. In the embodiment, the magnetic circuit for the rotary transformer is isolated from that for each magnetic head, and therefore most suitable core materials can be selected for the magnetic circuits. Furthermore, in the embodiment, the distortion of the cores 11 and 92 caused by adjustment of the level of the head tip is much less than in the other embodiments.

The head level adjusting mechanism as shown in FIGS. 12 through 16 is applicable to a conventional magnetic head comprising a coil wound on a core. In this case, similarly as in the above-described cases, the number of components can be reduced, and the rotary head device can be miniaturized, and manufactured at low cost.

As was described above, the magnetic head device of the invention comprises: the head tip made up of one pair of cores which are confronted with each other in such a manner that they are sufficiently spaced away from each other with the magnetic gap formed at one end; a bridge core which bridges the pair of cores so that the magnetic flux flows out of one of the cores and flows in the other core; and the coil placed in the path of the magnetic flux which flows out of the one core and flows in the other core. Therefore, the magnetic head device of the invention can be manufactured readily. Accordingly, it can be manufactured in a relatively short time, and the manufacturing cost can be reduced. Furthermore, it can be made smaller in size.

In the foregoing rotary head device, the four coils for two channels are provided for the rotary transformer in correspondence to the pair of heads, and signals are applied to or received from the heads independently and simultaneously. Accordingly, the rotary head device is relatively large in the diameter of the rotary drum and the stationary drum.

Figure 17:
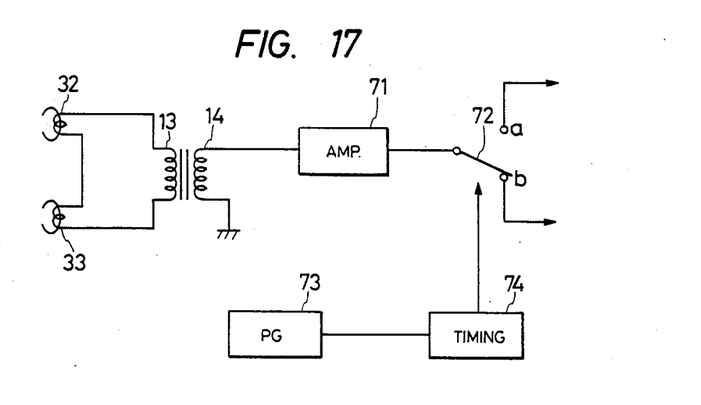
FIG. 17 is a block diagram showing the device of FIG. 12.

FIG. 17 is a block diagram showing the rotary head device according to the invention. A signal induced in the coil 32 (or 33) is applied to the coil 13, and simultaneously a signal is induced in the coil 14 which forms the rotary transformer together with the coil 13. The signal, after being amplified by an amplifier circuit 71, is applied to a switch 72. A pulse generator (PG) 73 is mounted on the shaft 1 so as to generate a PG pulse in synchronization with the angle of rotation of the rotary drum 3 (i.e., the heads). A timing signal generating circuit 74, with the aid of the PG pulse, a timing signal (or head switching pulse) in correspondence to the angles of rotation of the pair of heads. In response to the timing signal, the armature of the switch 72 is tripped. For instance, the armature of the switch 72 is tripped over to the contact a when the head of the coil 32 is brought into contact with the magnetic tap, and it is tripped over to the contact b when the head of the coil 33 is brought into contact with the magnetic tape. Thus, the outputs of the heads are provided at the contact a and b, respectively.

On the other hand, signals applied to the contracts a and be can be supplied to the heads, respectively.

Figure 18:
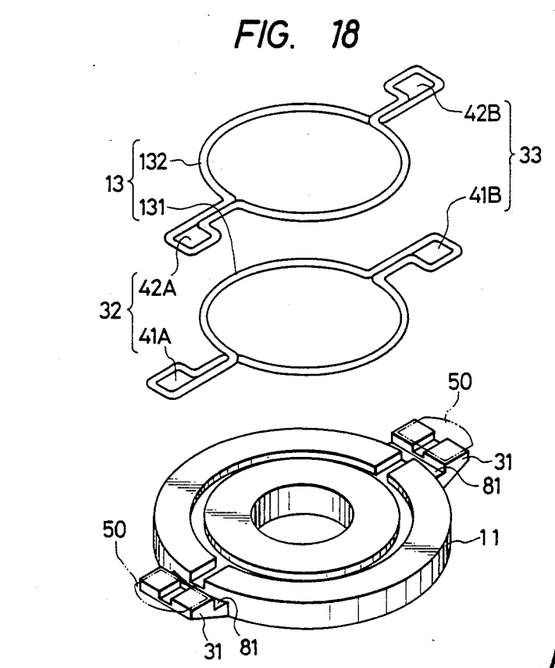
FIG. 18 is a perspective view showing the assembly of a coil and a rotor in another example of the rotary head device according to the invention.

FIG. 18 shows another embodiment of the invention. In the embodiment, loops 41A and 42A form a coil 32, loops 41B and 42B form a coil 33, and coils 131 and 132 form a coil 13. The loop 41A of the coil 32 is connected through the coil 131 in series to the loop 41B of the coil 33, while the loop 42A of the coil 32 is connected through the coil 132 in series to the loop 42B of the coil 33. In the embodiment, similarly as in the above-described embodiment, when the magnetic flux flows out of one of the loops 41A and 42A (or 41B and 42B) and flows in the other, the currents flowing in the coils 131 and 132 are the same in direction. Therefore, signals can be transmitted through the rotary transformer in two ways.

Figure 19:
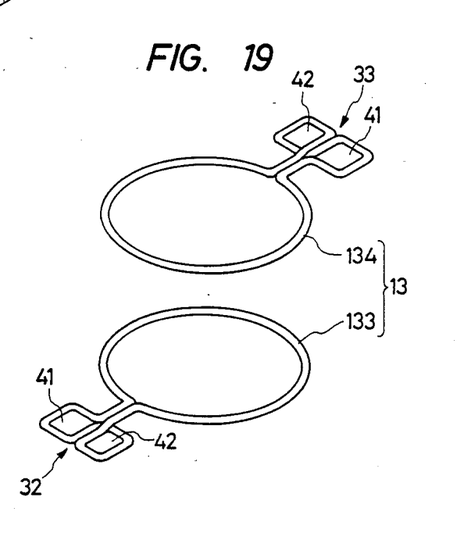
FIG. 19 is a perspective view showing a coil in another example of the rotary head device according to the invention.

In another embodiment of the invention, as shown in FIG. 19, the loops 41 and 42 of a coil 32 ar are connected to each other through a coil 133, and the loops 41 and 42 of a coil 33 are connected each other through a coil 134. The coils 133 and 134 form a coil 13. In the embodiment, the coil 32 is not directly series-connected to the coil 33; however, the coils 133 and 134 provide substantially one channel in the rotary transformer.

The technical concept of the invention is applicable to a conventional magnetic head comprising a coil wound on a core. In this case, similarly as in the above-described cases, the number of components can be reduced, and the rotary head device can be miniaturized, and manufactured at low cost.

As was described above, the rotary head device of the invention comprises: the first core forming the rotor; the first coil arranged on the first core, forming a part of the rotary transformer which is substantially for one channel; the pair of heads connected to the first coil and spaced 180° apart from each other; the second core forming the stator; and the second coil arranged on the second core, forming the part of the rotary transformer together with the first coil. Therefore, the rotary head device of the invention is simple in construction, low in manufacturing cost and small in size.

I claim:

1. A magnetic head device comprising:
   a head tip including a pair of cores which are confronted with each other in such a manner that a magnetic gap is formed at one end portion thereof, the remaining portion of said cores being sufficiently spaced from each other such that a magnetic flux flowing through said cores during playback does not flow directly between said pair of cores;
   a bridge core bridging said pair of cores to allow said magnetic flux to flow out of one of said pair of cores and flow in the other core through said bridge core; and
   at least one coil disposed on at least one of said pair of cores such that said magnetic flux passes through a center thereof so as to induce electromotive force therein.

2. A magnetic head device comprising:
   a first core forming a portion of a rotor;
   a first coil arranged on said first core;
   a pair of heads connected to said first coil and spaced 180° apart from each other;
   a second core forming a portion of stator; and
   a second coil arranged on said second core, said first and second coils constituting a portion of a rotary transformer.

* * * * *